US009058247B2

(12) United States Patent
Fukamachi

(10) Patent No.: US 9,058,247 B2
(45) Date of Patent: Jun. 16, 2015

(54) RISK POTENTIAL CALCULATION APPARATUS

(75) Inventor: Hideo Fukamachi, Hadano (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 13/821,395

(22) PCT Filed: Sep. 8, 2010

(86) PCT No.: PCT/JP2010/065430
§ 371 (c)(1),
(2), (4) Date: Mar. 7, 2013

(87) PCT Pub. No.: WO2012/032624
PCT Pub. Date: Mar. 15, 2012

(65) Prior Publication Data
US 2013/0204516 A1 Aug. 8, 2013

(51) Int. Cl.
G01S 13/88 (2006.01)
G01S 13/93 (2006.01)
(Continued)

(52) U.S. Cl.
CPC .............. *G06F 17/00* (2013.01); *G01S 13/93* (2013.01); *G01S 1/02* (2013.01); *G01S 13/931* (2013.01);
(Continued)

(58) Field of Classification Search
USPC ........... 701/36, 41, 44, 45, 46, 48, 58, 70, 77, 701/93–98, 300–302; 340/435–438, 340/901–905
See application file for complete search history.

(56) References Cited

U.S. PATENT DOCUMENTS 5,515,448 A * 5/1996 Nishitani ...................... 382/106
5,517,196 A * 5/1996 Pakett et al. .................... 342/70
(Continued)

FOREIGN PATENT DOCUMENTS

JP 2003-323627 A 11/2003
JP 2005-138764 A 6/2005
(Continued)

OTHER PUBLICATIONS

English language abstract and complete English machine translation of JP 2005-138764 (previously submitted).
(Continued)

Primary Examiner — Thomas Tarcza
Assistant Examiner — Tyler J Lee
(74) Attorney, Agent, or Firm — Sughrue Mion, PLLC

(57) ABSTRACT

A risk potential estimating device 20 of a driving support apparatus 10 calculates the risk potential of an object at each of a plurality of points which are set around a host vehicle 100. When there is a pedestrian M2 in a blind spot B caused by a pedestrian M1 in the field of view of the host vehicle 100, the risk potential estimating device 20 omits the calculation of the risk potential of the pedestrian M2. When there is the pedestrian M1 close to the host vehicle 100, first, the behavior of avoiding the pedestrian M1 is performed. Therefore, the risk potential of the pedestrian M1 may be calculated at each point. In many cases, the calculation of the risk potential of the pedestrian M2 which is located in the blind spot B caused by the pedestrian M1 and is away from the host vehicle 100 is redundant. When the calculation of the risk potential of the pedestrian M2 which is located in the blind spot B caused by the pedestrian M1 is omitted, it is possible to reduce the load of an operation for calculating the risk potential while maintaining the accuracy of calculating the risk potential around the vehicle.

8 Claims, 13 Drawing Sheets

(51) Int. Cl.
*G06F 17/00* (2006.01)
*G08G 1/16* (2006.01)
*G06T 7/00* (2006.01)
*G01S 1/02* (2010.01)

(52) U.S. Cl.
CPC ............... *G08G 1/166* (2013.01); *G08G 1/167* (2013.01); *G06T 7/0042* (2013.01); *G06T 2207/10021* (2013.01); *G06T 2207/10028* (2013.01); *G06T 2207/30261* (2013.01)

(56) References Cited

U.S. PATENT DOCUMENTS

| | | | | |
|---|---|---|---|---|
| 6,069,581 | A * | 5/2000 | Bell et al. | 342/70 |
| 6,122,597 | A * | 9/2000 | Saneyoshi et al. | 701/301 |
| 6,400,308 | B1 * | 6/2002 | Bell et al. | 342/71 |
| 6,853,738 | B1 * | 2/2005 | Nishigaki et al. | 382/106 |
| 7,356,408 | B2 * | 4/2008 | Tsuchiya et al. | 701/538 |
| 7,379,813 | B2 * | 5/2008 | Kubota et al. | 701/523 |
| 7,715,275 | B2 * | 5/2010 | Boecker et al. | 367/96 |
| 7,904,247 | B2 * | 3/2011 | Nakamori | 701/301 |
| 8,060,307 | B2 * | 11/2011 | Matsuno | 701/301 |
| 8,126,209 | B2 * | 2/2012 | Sasakawa et al. | 382/104 |
| 8,248,295 | B2 * | 8/2012 | Tsunekawa | 342/70 |
| 8,368,755 | B2 * | 2/2013 | Nishida et al. | 348/148 |
| 8,437,536 | B2 * | 5/2013 | Saito | 382/154 |
| 8,489,284 | B2 * | 7/2013 | Emam et al. | 701/45 |
| 8,509,523 | B2 * | 8/2013 | Schamp | 382/156 |
| 2004/0172185 | A1 | 9/2004 | Yamamura et al. | |
| 2008/0243390 | A1 * | 10/2008 | Nakamori | 701/301 |
| 2008/0288140 | A1 | 11/2008 | Matsuno | |
| 2009/0037052 | A1 * | 2/2009 | Ogasawara et al. | 701/41 |
| 2009/0210157 | A1 * | 8/2009 | Lee | 701/301 |
| 2010/0106356 | A1 * | 4/2010 | Trepagnier et al. | 701/25 |
| 2010/0250064 | A1 * | 9/2010 | Ota et al. | 701/36 |
| 2011/0106442 | A1 * | 5/2011 | Desai et al. | 701/208 |
| 2012/0323479 | A1 * | 12/2012 | Nagata | 701/301 |

FOREIGN PATENT DOCUMENTS

| | | |
|---|---|---|
| JP | 2005-138765 A | 6/2005 |
| JP | 3938023 B2 | 4/2007 |
| JP | 2007-251257 A | 9/2007 |
| JP | 2008-171207 A | 7/2008 |
| JP | 2009-026250 A | 2/2009 |

OTHER PUBLICATIONS

English language abstract and complete English machine translation of JP 2005-138765 (previously submitted).

* cited by examiner

RISK POTENTIAL CALCULATION APPARATUS

The present invention relates to a risk potential calculation apparatus, and more particularly, to a risk potential calculation apparatus for calculating a risk potential around a host vehicle.

BACKGROUND ART

In order to improve traveling safety, an apparatus has been proposed which calculates a risk potential around a vehicle. For example, Patent Literature 1 discloses an apparatus in which a camera captures an image, a preprocessing unit processes the image, and a pedestrian recognition unit recognizes a pedestrian from the input image. In the apparatus disclosed in Patent Literature 1, a priority setting unit sets priority on the basis of the size, position, and movement state of a pedestrian image in the input image. In the apparatus disclosed in Patent Literature 1, a calculation order determining unit determines the order of a distance calculation process by a calculation unit such that the distance is sequentially calculated from the pedestrian with high priority.

CITATION LIST

Patent Literature

[Patent Literature 1] Japanese Unexamined Patent Application Publication No. 2007-251257

SUMMARY OF INVENTION

Technical Problem

However, in the above-mentioned technique, when there are many objects, such as pedestrians, the operation load of the apparatus is likely to increase. Therefore, an apparatus is desirable which can reduce an operation load while maintaining the accuracy of calculating the risk potential around the vehicle.

The invention has been made in view of the above-mentioned problems and an object of the invention is to provide a risk potential calculation apparatus which can reduce an operation load while maintaining the accuracy of calculating a risk potential around the vehicle.

Solution to Problem

According to an aspect of the invention, there is provided a risk potential calculation apparatus including a risk potential calculation unit that calculates a. risk potential of an object at each of a plurality of points which are set around a host vehicle. When there is a second object in a blind spot caused by a first object in a field of view of the host vehicle, the risk potential calculation unit omits the calculation of the risk potential of the second object.

According to this structure, the risk potential calculation, unit calculates the risk potential of the object at each of the plurality of points which are set around the host vehicle. When there is the second object in the blind spot caused by the first object in the field of view of the host vehicle, the risk potential calculation unit omits the calculation of the risk potential of the second object. When the first object is close to the host vehicle, first, the behavior of avoiding the first object is performed. Therefore, the risk potential of the first object may be calculated at each point. In many cases, the calculation of the risk potential of the second object which is located in the blind spot caused by the first object and is away from the host vehicle is redundant. Therefore, when the calculation of the risk potential of the second object which is located in the blind spot caused by the first object is omitted, it is possible to reduce the load of an operation for calculating the risk potential around the vehicle while maintaining the accuracy of calculating the risk potential.

In this case, the risk potential calculation unit may calculate the risk potential of the objects in an order of the first object which is close to the host vehicle and the second object which is further away from the host vehicle than the first object.

According to this structure, the risk potential calculation unit calculates the risk potential of the objects in the order of the first object which is close to the host vehicle and the second object which is further away from the host vehicle than the first object. When the risk potential of the objects is calculated in ascending order of distance from the host vehicle, the calculation of the risk potential of the second object which is located in the blind spot caused by the first object whose risk potential has been calculated and is away from the host vehicle is omitted. Therefore, it is possible to reduce the operation load while calculating the risk potential of the object which has a great effect on the host vehicle.

When there is the second object in the blind spot caused by the first object in the field of view of the host vehicle and the host vehicle travels toward a point where the second object is present, the risk potential calculation unit may calculate the risk potential of the second object.

According to this structure, when there is the second object in the blind spot caused by the first object in the field of view of the host vehicle and the host vehicle travels toward the point where the second object is present, the risk potential calculation unit may calculate the risk potential of the second object. When the host vehicle travels toward the point where the second object is present, it is necessary to calculate the risk potential even though the second object is present in the blind spot caused by the first object. Therefore, it is possible to calculate the risk potential of the second object, if necessary.

When the risk potential of the second object is calculated after the risk potential of the first object is calculated, the risk potential calculation unit may omit the calculation of the risk potential of the second object at the point where the risk potential of the first object has been calculated.

According to this structure, when the risk potential of the second object is calculated after the risk potential of the first object is calculated, the risk potential calculation unit omits the calculation of the risk potential of the second object at the point where the risk potential of the first object has been calculated. At the point where the risk potential of the first object has been calculated, a behavior, such as avoidance, is performed on the basis of the risk potential of the first object. In many cases, the calculation of the risk potential of the second object at the point where the risk potential of the first object has been calculated is redundant. Therefore, when the calculation of the risk potential of the second object at the point where the risk potential of the first object has been calculated is omitted, it is possible to reduce the load of the operation for calculating the risk potential.

Advantageous Effects of Invention

According to the risk potential calculation apparatus of the invention, it is possible to reduce the operation load of the

DESCRIPTION OF EMBODIMENTS

Figure 1:
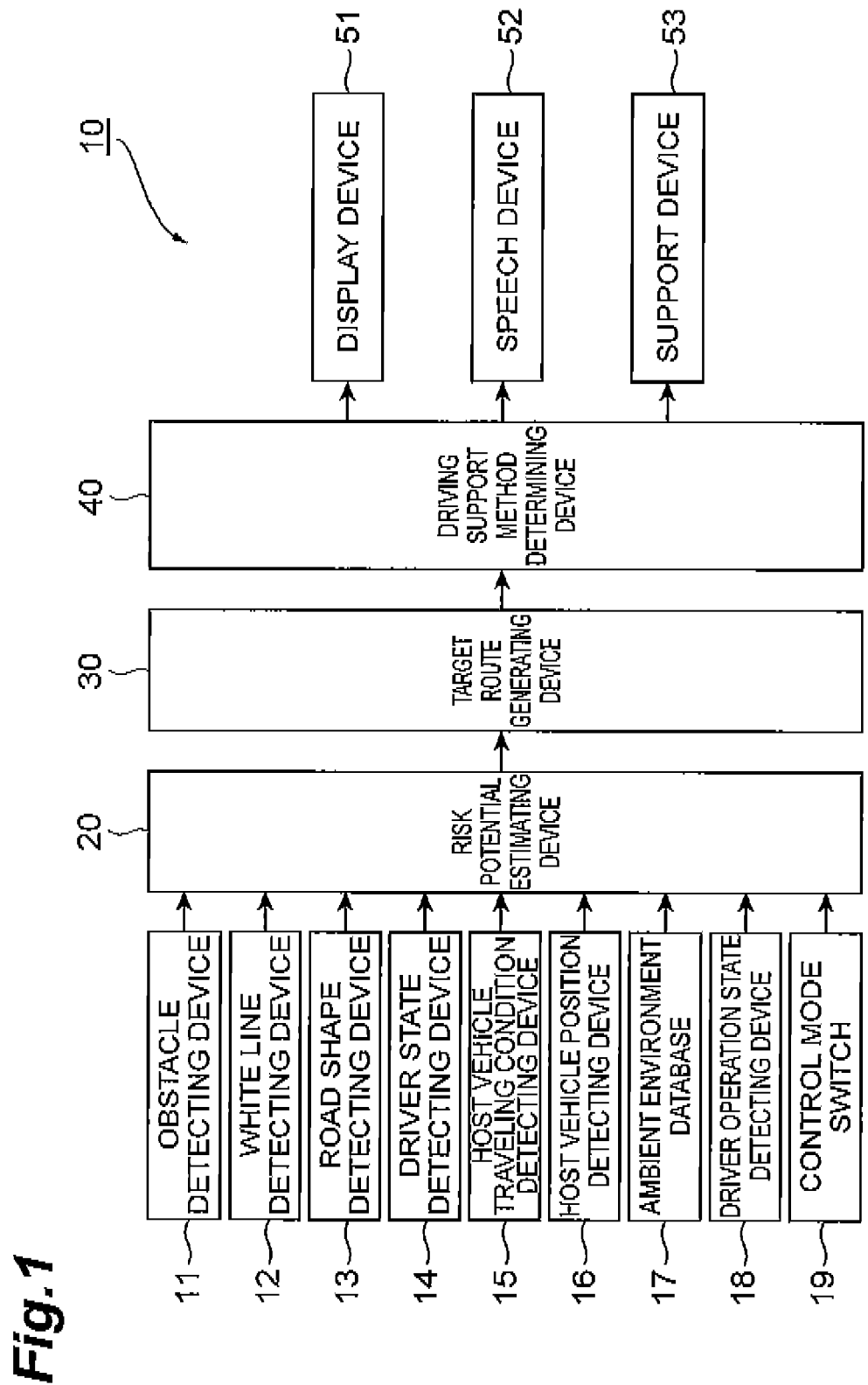
FIG. 1 is a block diagram illustrating the structure of a driving support apparatus according to an embodiment.

Hereinafter, an embodiment of the invention will be described with reference to the accompanying drawings. In this embodiment, a potential risk calculation apparatus is applied to a driving support apparatus. As shown in FIG. 1, a driving support apparatus 10 includes an obstacle detecting device 11, a white line detecting device 12, a road shape detecting device 13, a driver state detecting device 14, a host vehicle traveling condition detecting device 15, a host vehicle position detecting device 16, an ambient environment database 17, a driver operation state detecting device 18, a control mode switch 19, a risk potential estimating device 20, a target route generating device 30, a driving support method determining device 40, a display device 51, a speech device 52, and a support device 53.

The obstacle detecting device 11 is, for example, a millimeter-wave radar, a laser radar, or a stereo camera and detects obstacles around the host vehicle. The white line detecting device 12 is a sensor, such as a camera, which recognizes a white line on the road which defines the lane of the road. The white line detecting device 12 is used to recognize the lane on which the host vehicle travels. The road shape detecting device 13 is, for example, a laser radar and detects the shape of the road on which the host vehicle travels.

The driver state detecting device 14 detects the direction of the face or the direction of the gaze of the driver of the host vehicle. Specifically, the driver state detecting device 14 captures the image of the face of the driver, recognizes the pattern of the captured image, and detects the direction of the face or the direction of the gaze of the driver.

The host vehicle traveling condition detecting device 15 detects the speed or yaw rate of the host vehicle or the direction indicated by a direction indicator. The host vehicle traveling condition detecting device 15 detects the rotation speed of the axle of the host vehicle and detects the speed of the host vehicle.

The host vehicle position detecting device 16 measures the position of the host vehicle using, specifically, a GPS (Global Positioning System). The ambient environment database 17 acquires information, such as information about the position of the host vehicle measured by the GPS, information about an intersection around the host vehicle, information about facilities, and information about high-accident locations, which are stored in a database which is provided inside or outside the host vehicle.

The driver operation state detecting device 18 detects steering torque, brake pedal stroke (pressing amount), and acceleration pedal stroke (pressing amount) by the driving operation of the driver and detects a steering amount, a brake amount, and an acceleration amount.

The control mode switch 19 is used to set a driving support system for supporting the driving operation of the driver of the host vehicle. The control mode switch 19 is used to set the operations of, for example, LICA (Lane Keeping Assist) which controls the traveling of the host vehicle so as not to depart from its lane, LDW (Lane Departure Warning) which gives an alarm when the host vehicle departs from the lane, ACC (Adaptive Cruise Control) which makes the host vehicle travel at a predetermined speed while the host vehicle follows a vehicle in front, PCS (Pre-Crush Safety) which avoids collision of the host vehicle or reduces damage due to collision, and a parking assistance system which assists the driving operation of the driver when the driver parks the host vehicle. Information about the set state of the driving support system is transmitted to the risk potential estimating device 20.

The risk potential estimating device 20 changes the setting of a mesh (hereinafter, referred to as a potential map in some cases), which is a lattice-shaped region around the host vehicle, on the basis of the information from the obstacle detecting device 11 to the control mode switch 19 and calculates potential risk value (hereinafter called risk potential or risk value) at each intersection point of the mesh or in each lattice-shaped region.

The target route generating device 30 sets a target route of the host vehicle on the basis of the risk potential at each intersection point of the mesh which is estimated by the risk potential estimating device 20.

The driving support method determining device (driving support ECU) 40 is a unit for determining a driving support method for the driver of the host vehicle on the basis of the risk potential estimated by the risk potential estimating device 20 and the target route set by the target route generating device 30.

The display device 51 visually displays necessary information on a HUD (Head-Up Display) or a meter on the basis of the driving support method determined by the driving support method determining device 40.

The speech device 52 provides necessary information with sounds or gives an alarm using, for example, a speaker or buzzer, on the basis of the driving support method determined by the driving support method determining device 40.

The support device 53 operates each of a brake actuator, an acceleration actuator, and an EPS (Electronic Power Steering) actuator on the basis of the driving support method determined by the driving support method determining device 40 and adjusts a brake amount, an acceleration amount, and a steering amount.

Figure 2:
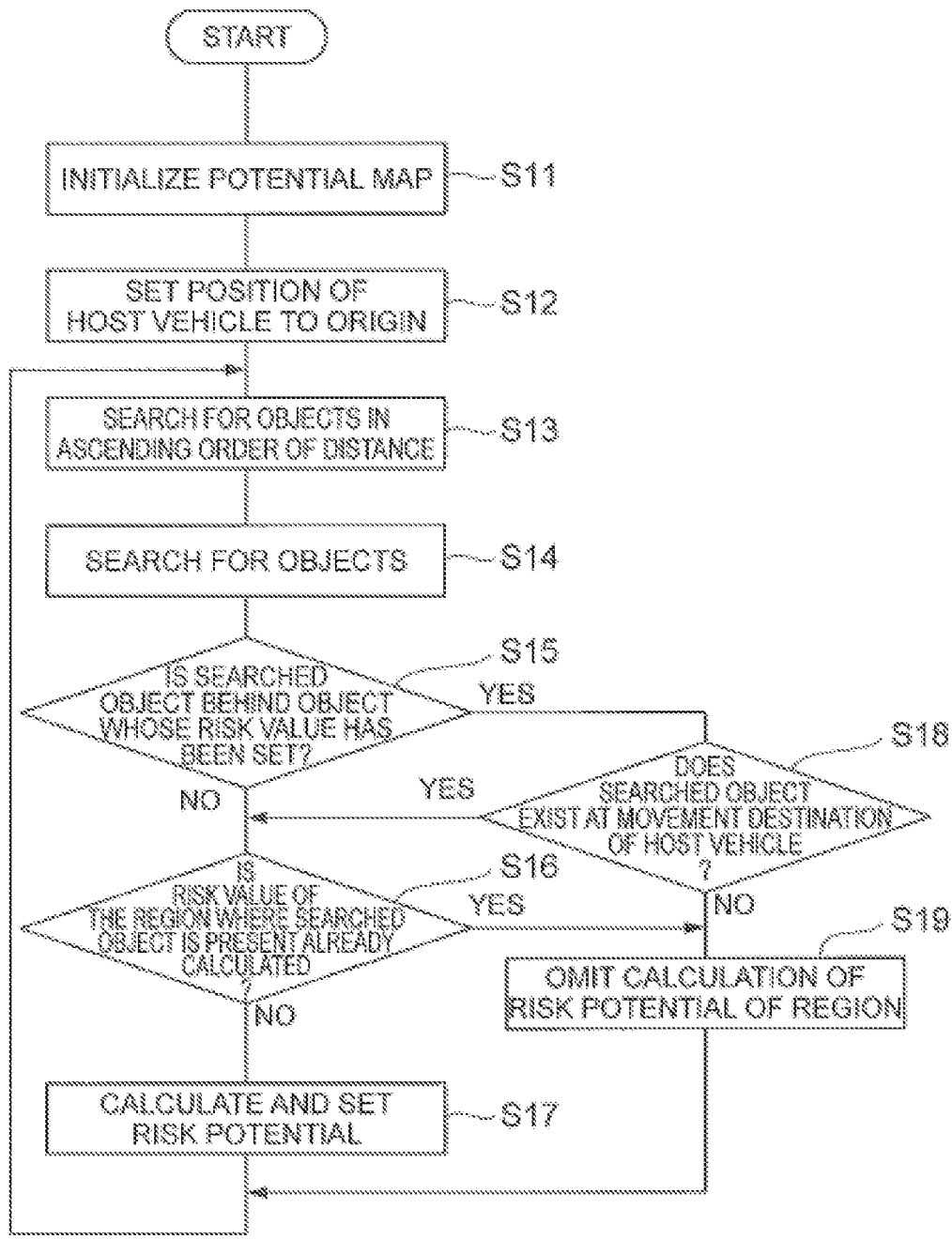
FIG. 2 is a flowchart illustrating the operation of the driving support apparatus according to the embodiment.
Figure 3:
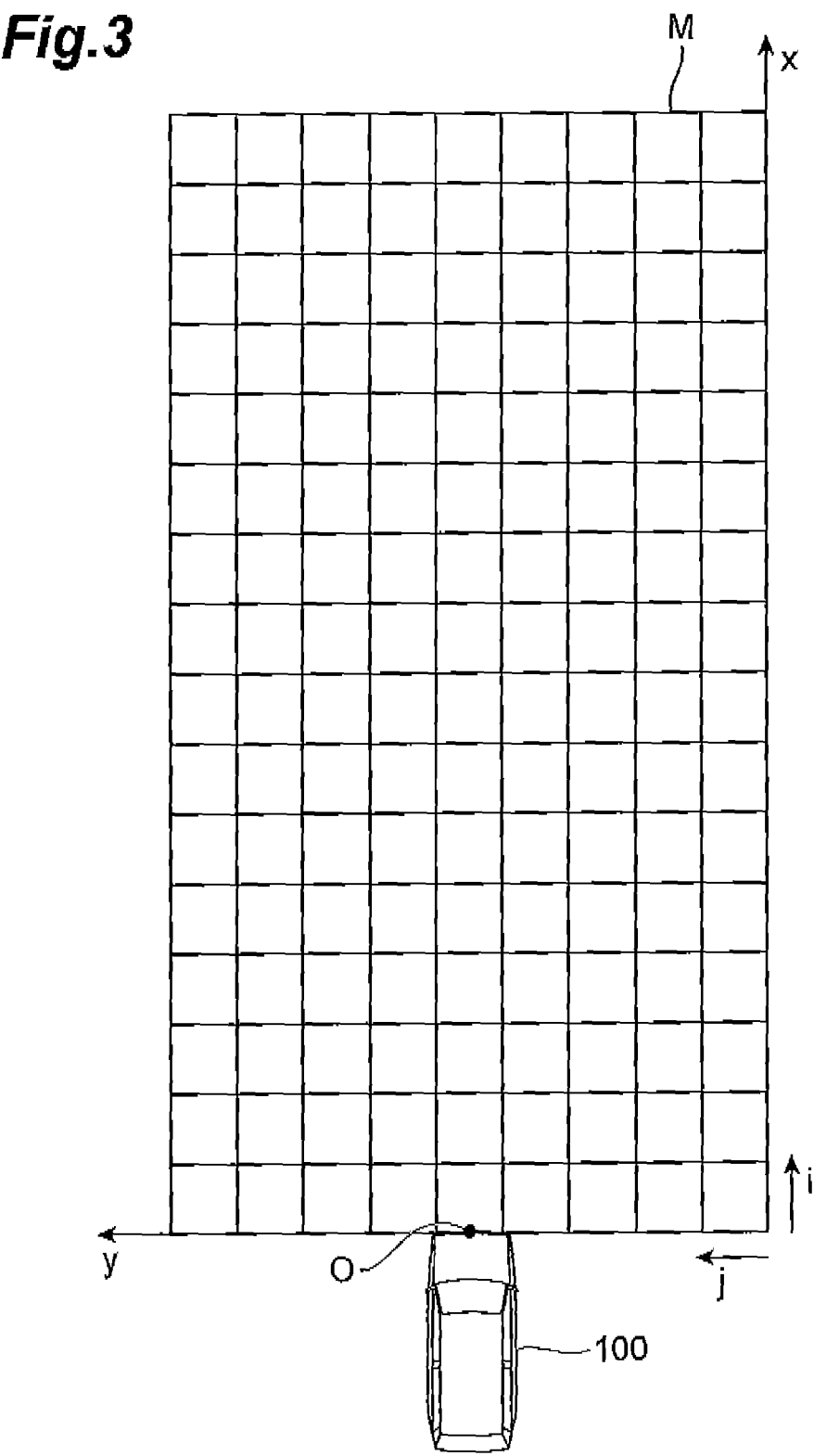
FIG. 3 is a diagram illustrating an initialized potential map according to the embodiment.

Next, the operation of the driving support apparatus 10 according to this embodiment will be described. The driving support apparatus 10 repeatedly performs the operation shown in the flowchart of FIG. 2 while the vehicle is traveling. The flow chart represented in FIG. 2 represents an executable program logic for the risk potential estimating device 20 to perform control. As shown in FIGS. 2 and 3, the risk potential estimating device 20 of the driving support apparatus 10 initializes a potential map M (S11). The risk potential estimating device 20 sets the position of the host vehicle 100 to the origin O of the potential map M (S12). As shown in FIG. 3, the potential map M is spread in a lattice shape in the X-axis direction (the longitudinal direction of a host vehicle 100) and the Y-axis direction (the lateral direction of the host vehicle 100). The size of each lattice-shaped region is defined by the magnitude of a unit vector i in the X-axis direction and the magnitude of a unit vector j in the Y-axis direction.

Figure 4:
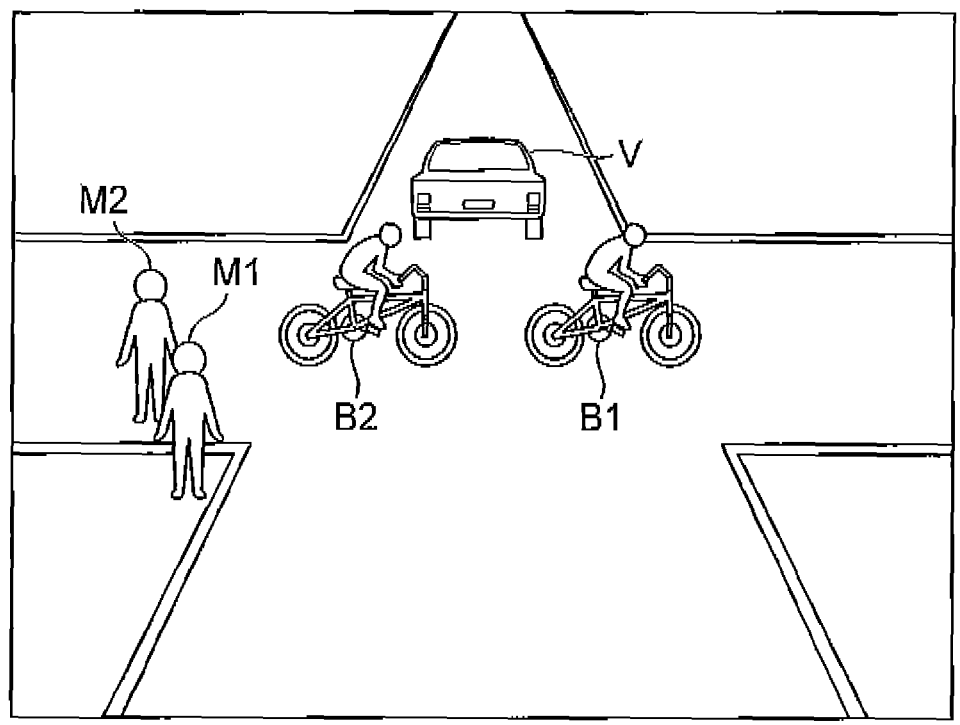
FIG. 4 is a perspective view illustrating a situation in which the driving support apparatus according to the embodiment is applied, as viewed from the driver's seat side of the host vehicle.
Figure 5:
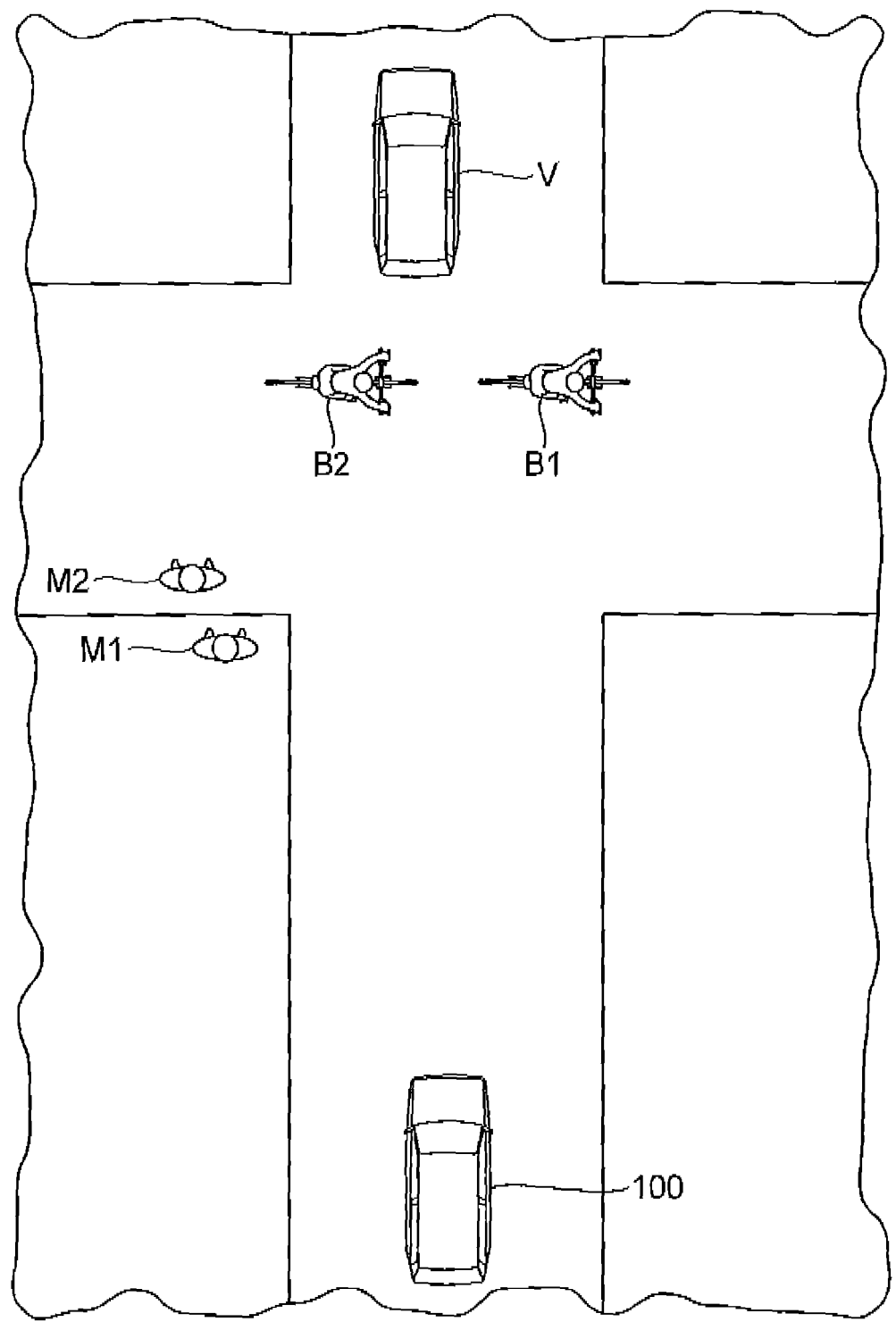
FIG. 5 is a plan view illustrating the situation in which the driving support apparatus according to the embodiment is applied.

In this embodiment, it is assumed that the host vehicle 100 is travelling just before the intersection shown in FIGS. 4 and 5. There are pedestrians M1 and M2, bicycles B1 and B2, and another vehicle V at the intersection. The risk potential estimating device 20 searches for objects in ascending order of distance from the host vehicle using the obstacle detecting device 11 (S13). The object closest to the host vehicle 100 is the pedestrian M1. Therefore, the risk potential estimating device 20 searches for the pedestrian M1 first.

When the searched object is not disposed behind the object whose risk value has been set (S15) and is not the region whose risk value has been calculated (S16), the risk potential estimating device 20 calculates a risk value for the object and sets the calculated risk value to each region in which the object is present (S17).

Figure 6:
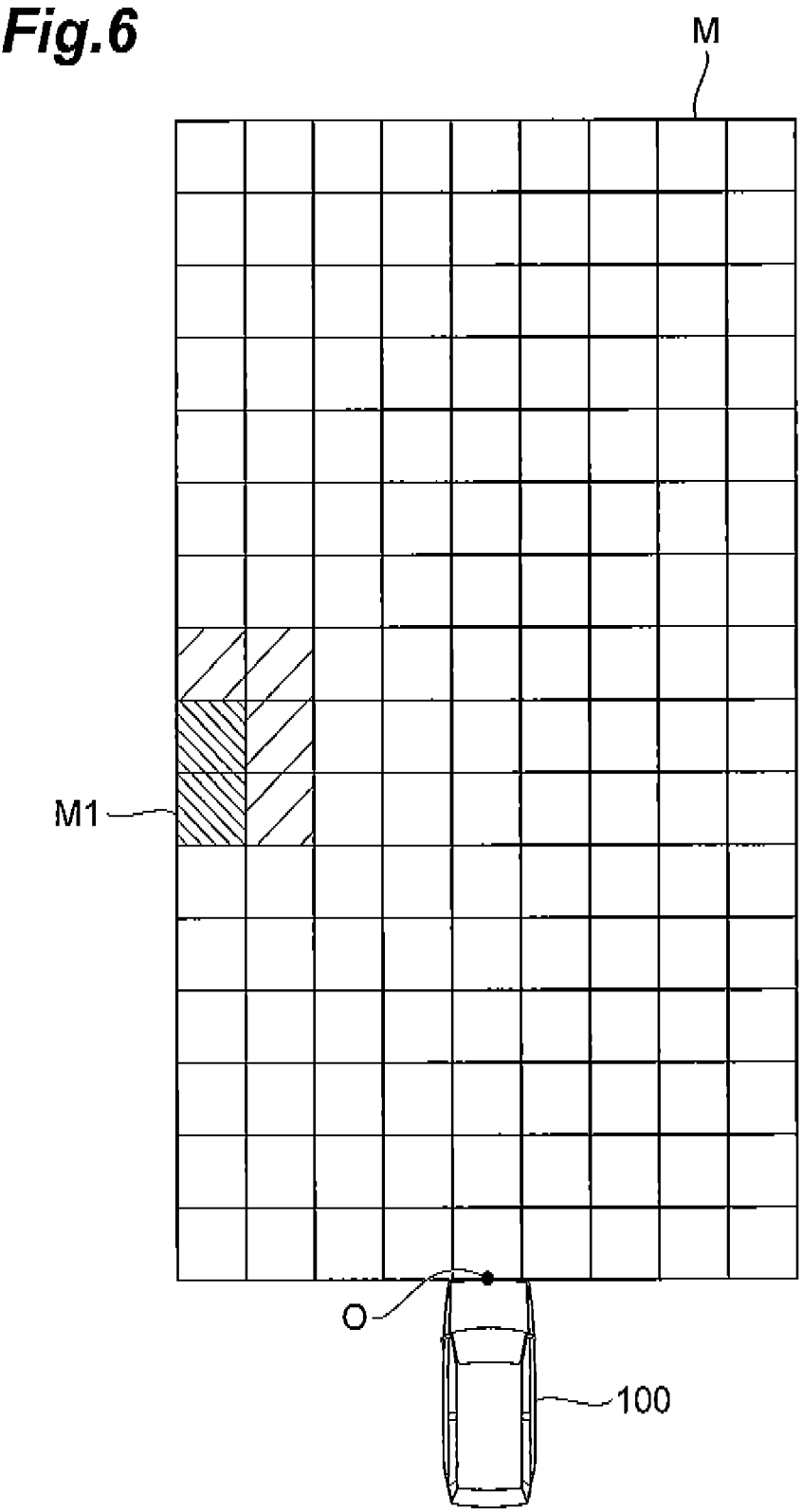
FIG. 6 is a diagram illustrating a potential map in which a risk value is calculated for an object close to the host vehicle.

When the object is a pedestrian M, it is not disposed behind other objects and is not disposed in the region whose risk value has been calculated. Therefore, the risk potential estimating device 20 writes the risk value of each lattice-shaped region to the potential map, as shown in FIG. 6 (S17). In FIG. 6, the region with a larger number of oblique lines has a larger risk value. Similarly, the risk potential estimating device 20 searches for objects in ascending order of distance from the host vehicle 100 (S13) and calculates and sets the risk potential (S17).

Figure 7:
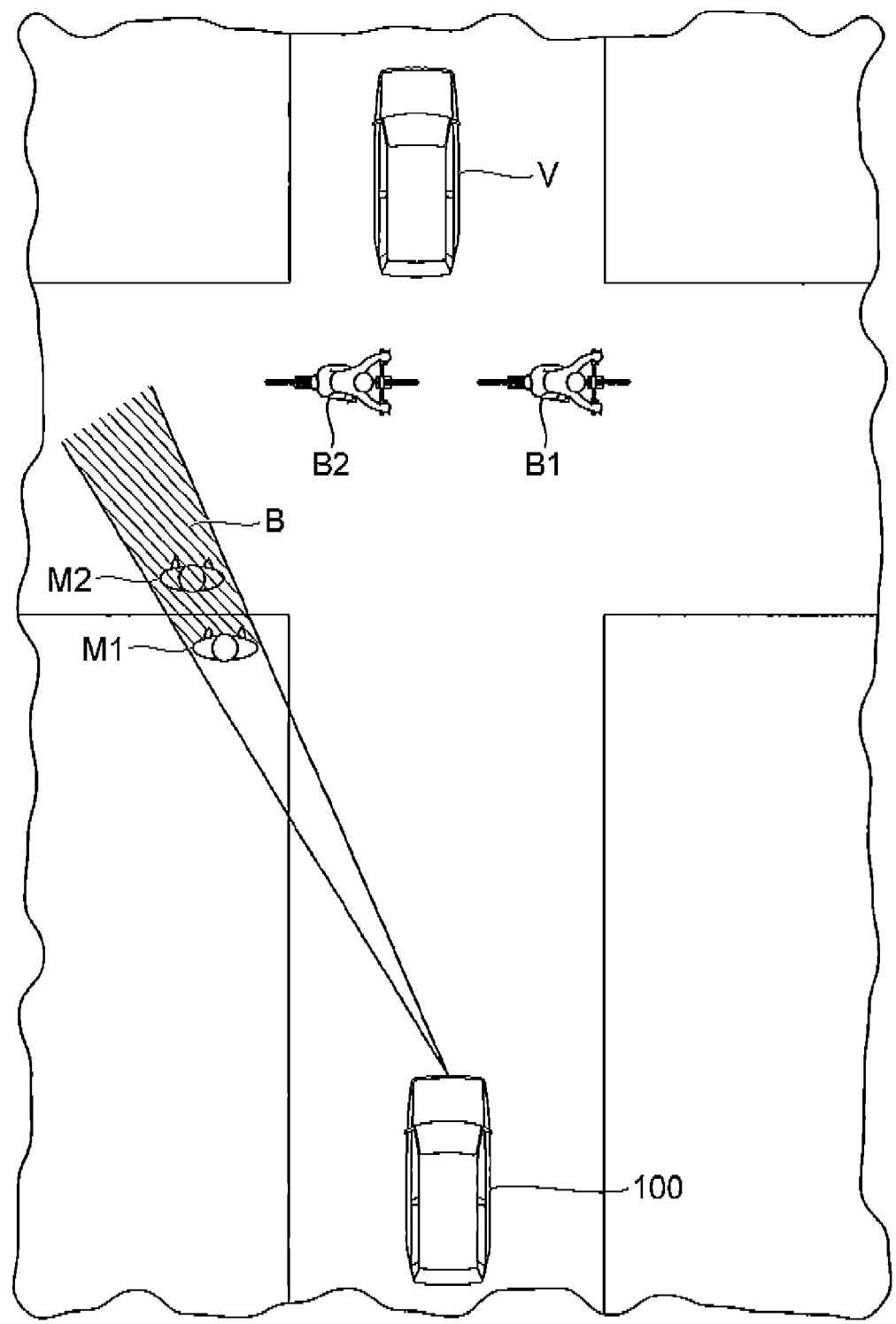
FIG. 7 is a plan view illustrating the handling of an object in the blind spot area of the host vehicle.

As shown in FIGS. 4 and 5, the pedestrian M1 is closest to the host vehicle 100 and the pedestrian M2 is the second closest object to the host vehicle 100. As shown in FIG. 7, the pedestrian M2 is located in a blind spot B behind the pedestrian M1 whose risk value has been set (S15). When the pedestrian M2 is not located at the movement destination of the host vehicle 100 (S18), the risk potential estimating device 20 omits the calculation of the risk potential of the region in order to remove the redundancy of the calculation of the risk value (S19). Therefore, even after the pedestrian M2 is searched for, the potential map M is maintained in the state shown in FIG. 6.

Figure 8:
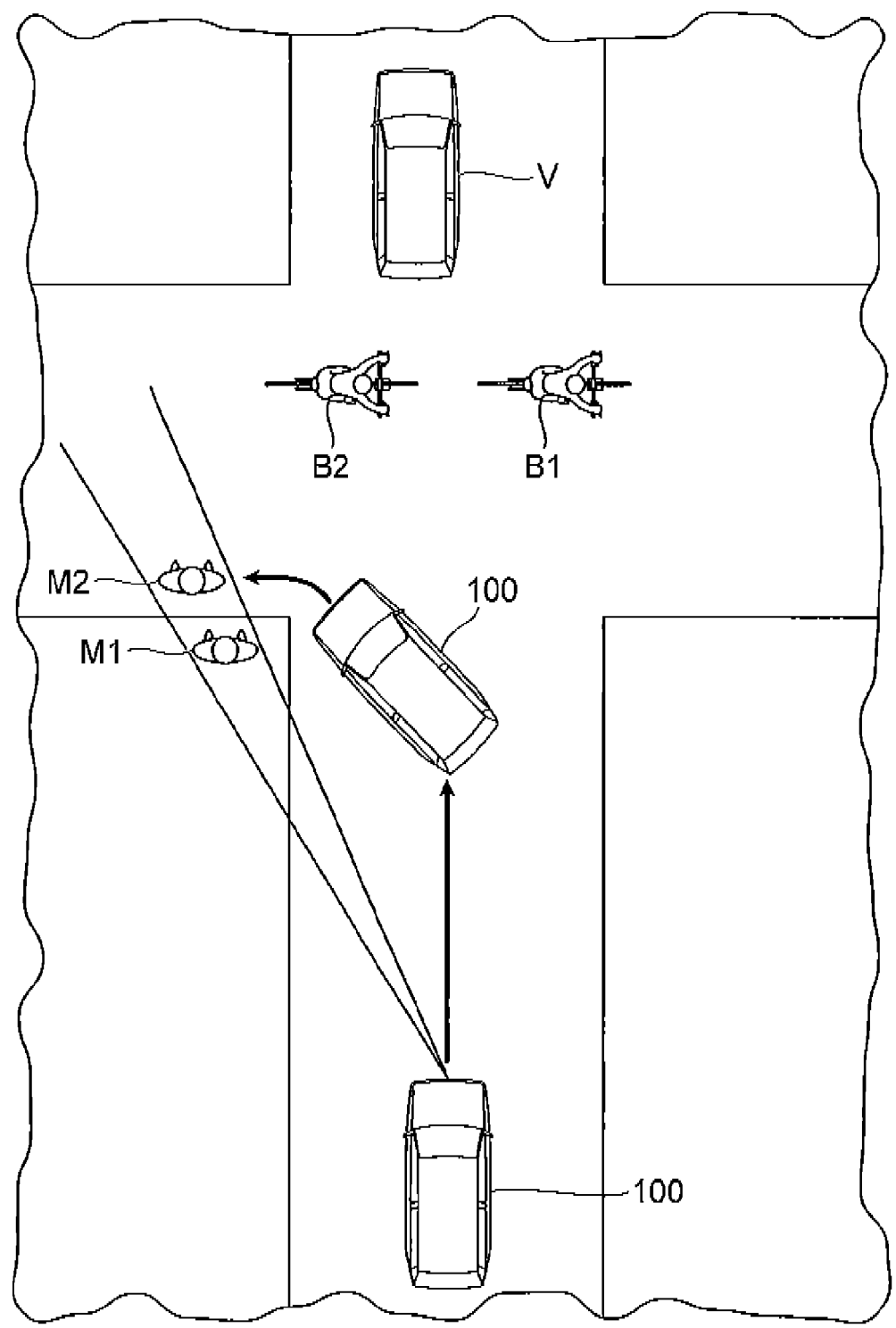
FIG. 8 is a plan view illustrating the handling of an object which is present in the blind spot area of the host vehicle and is disposed in the traveling direction of the host vehicle.
Figure 9:
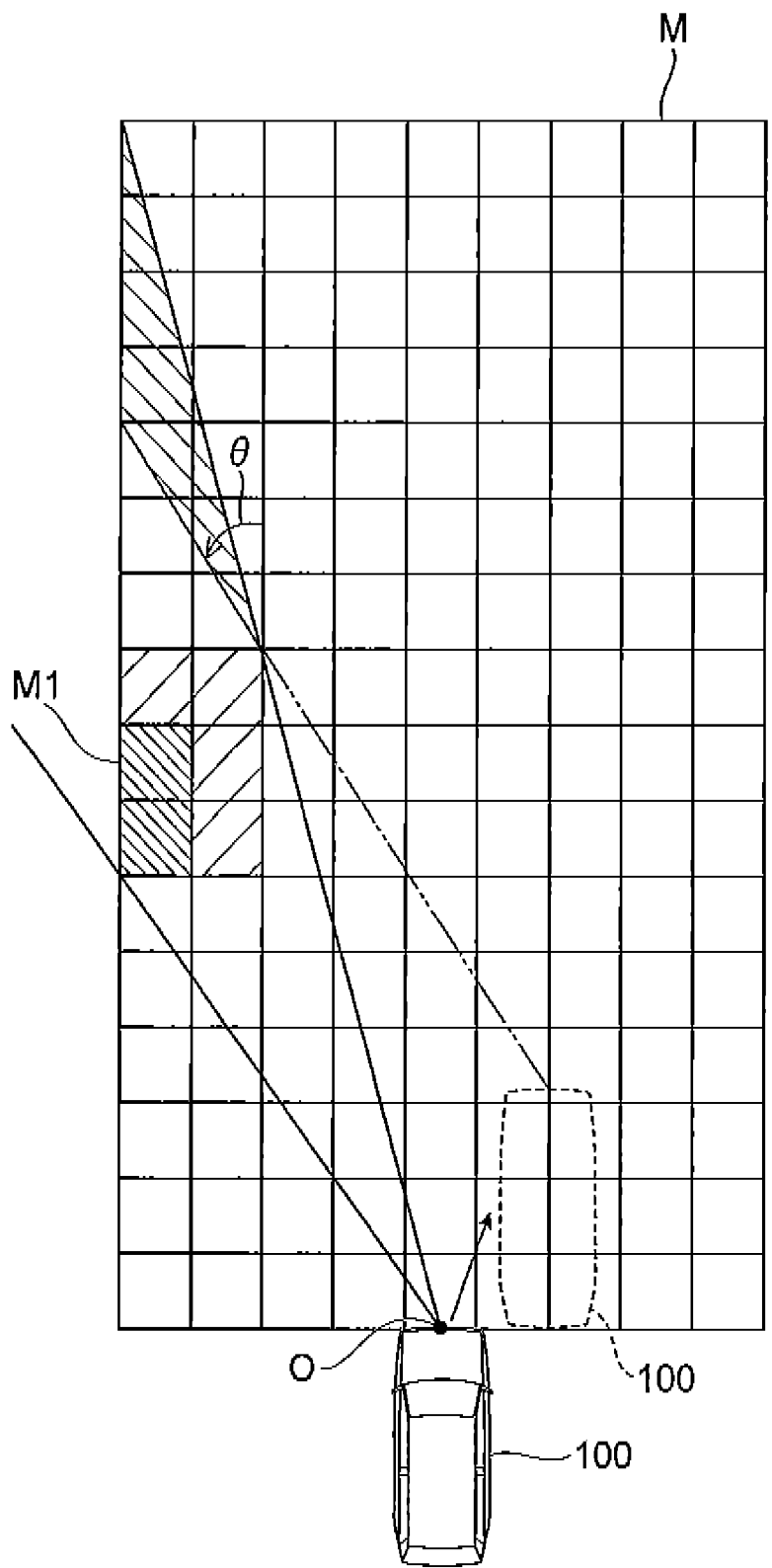
FIG. 9 is a plan view illustrating the handling of the blind spot area of the host vehicle, considering the movement of the host vehicle in the lateral direction.

When the driver state detecting device 14, the host vehicle traveling condition detecting device 15, or the driver operation state detecting device 18 detects that the host vehicle 100 turns left at the intersection and travels to the region of the pedestrian M2 as shown in FIG. 8 (S18), the risk potential estimating device 20 calculates the risk potential even for the region in which the pedestrian M2 is present and sets the calculated risk value to the region (S17) on condition that the region where M2 is present is not the region where risk value has been calculated (S16). In this case, as shown in FIG. 9, when the host vehicle 100 moves in the lateral direction, the risk value is calculated for a region corresponding to an angle θ which corresponds to the amount of movement in the lateral direction.

Figure 10:
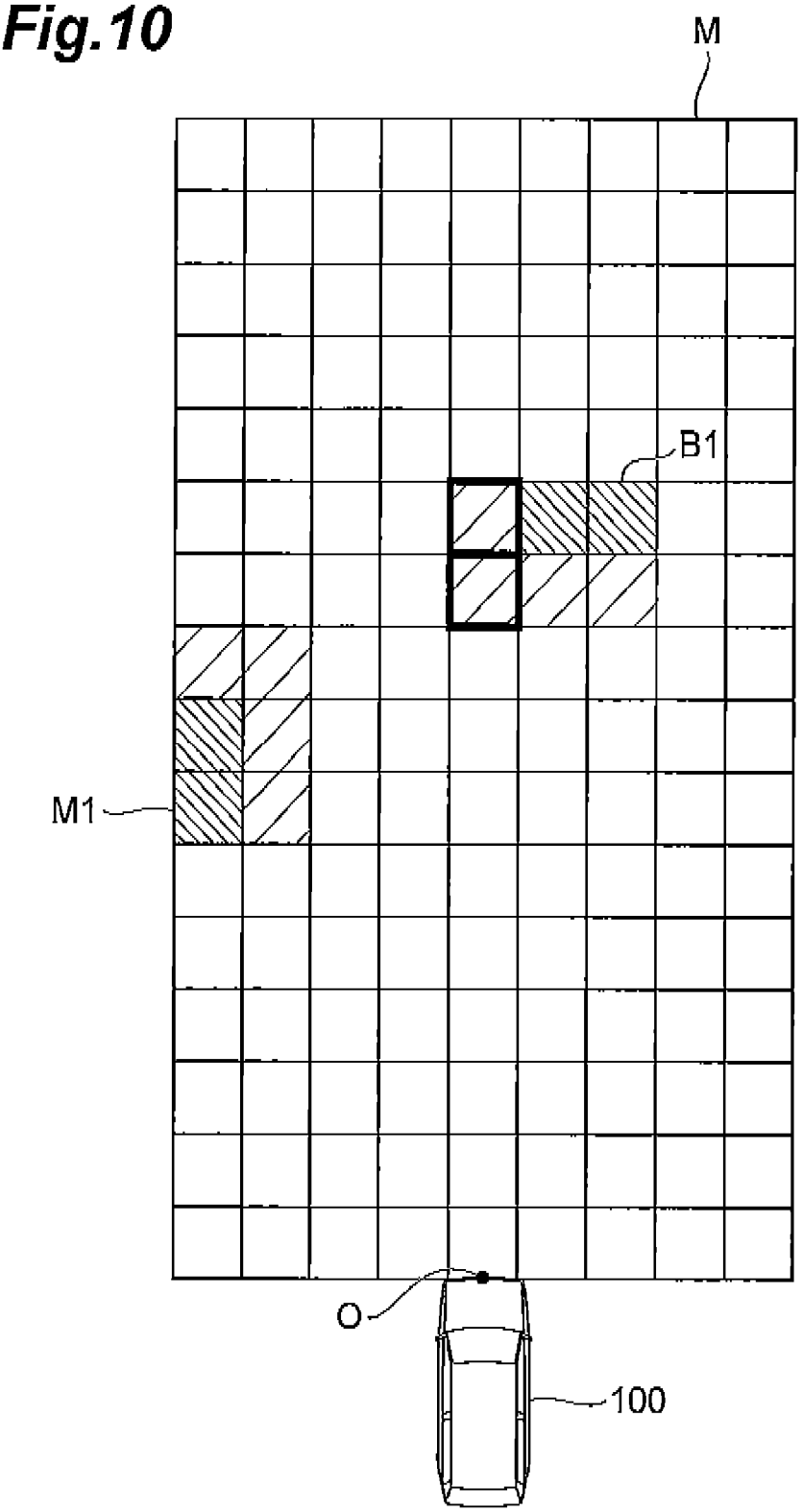
FIG. 10 is a diagram illustrating a potential map in which a risk value is calculated for one of two bicycles.

Then, the risk potential estimating device 20 searches for the bicycles B1 and B2. The potential map M having the risk potential set by the bicycle B1 is as shown in FIG. 10. Since the bicycle B1 and the bicycle B2 are close to each other, the risk potential of the region which is represented by a bold line in FIG. 10 has already been set when the risk potential estimating device 20 calculates the risk potential of the bicycle B2 (S16).

Figure 11:
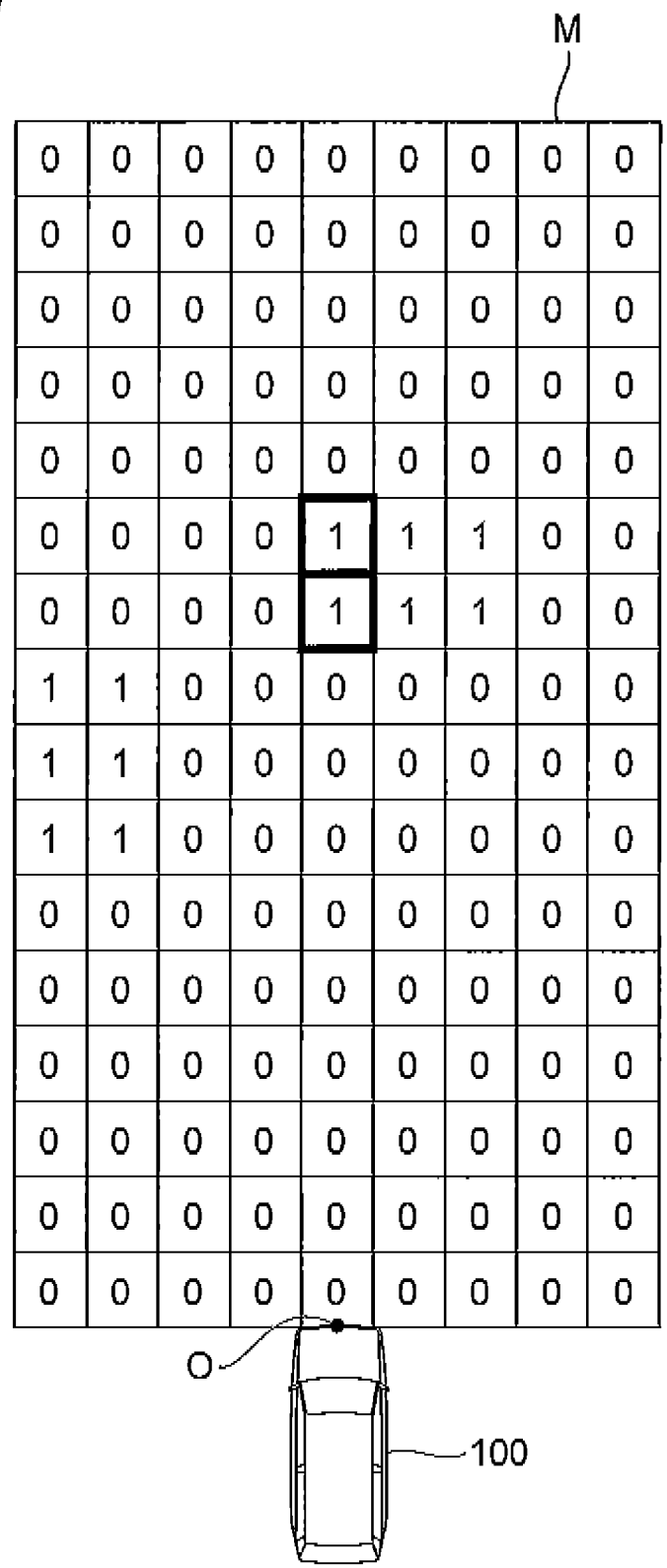
FIG. 11 is a diagram illustrating a flag set to the region in which the risk value has been calculated in the potential map shown in FIG. 10.
Figure 12:
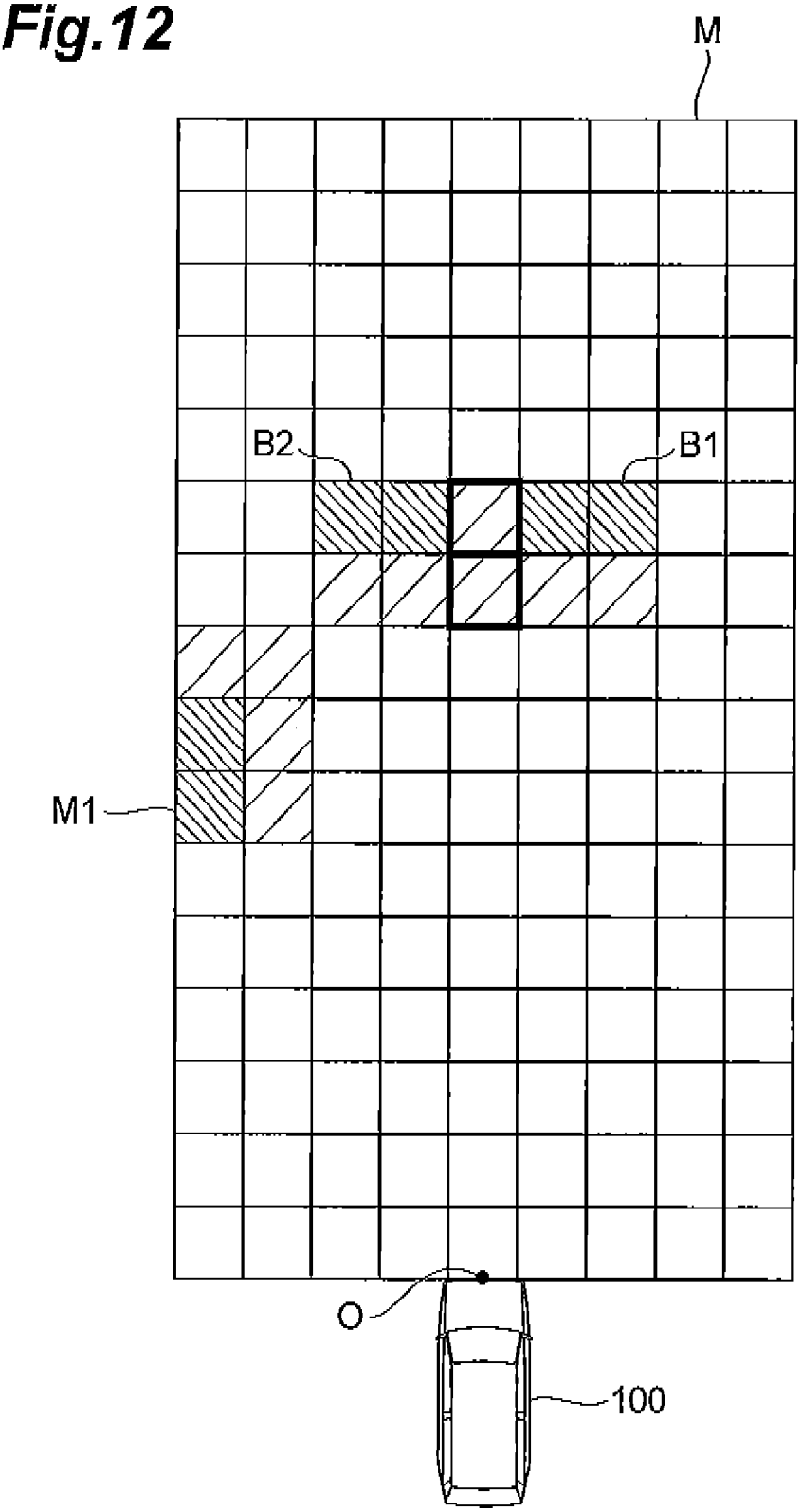
FIG. 12 is a diagram illustrating a potential map in which the risk values are calculated for both the two bicycles.
Figure 13:
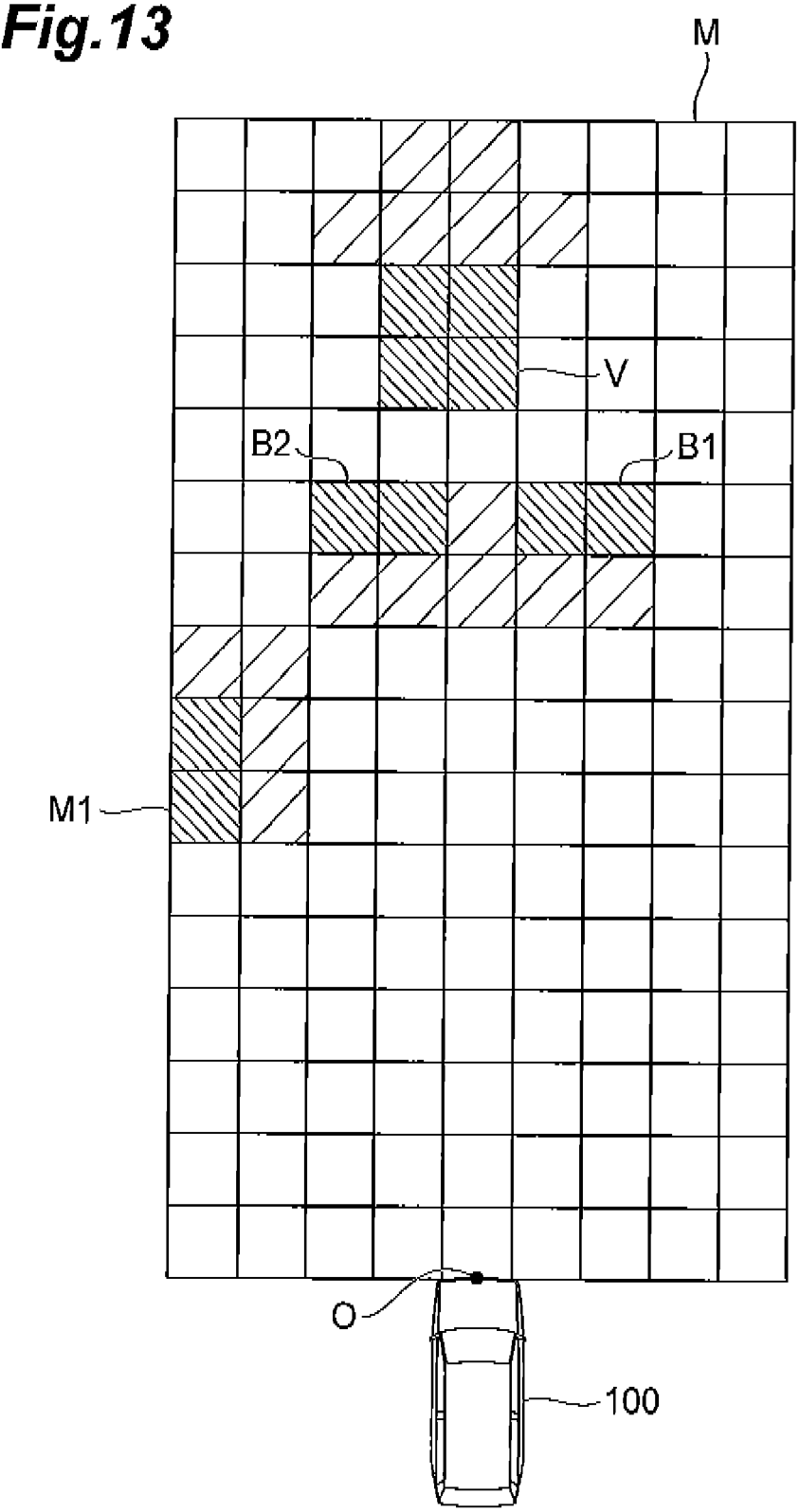
FIG. 13 is a diagram illustrating a potential map in which the risk values are calculated for all objects.

Then, in order to reduce the redundancy of the calculation of the risk value, the risk potential estimating device 20 sets a flag "1" to the region which risk potential has been set in the potential map M in which a flag "0" is set to each region in the initialized state shown in FIG. 11, In this way, the risk potential estimating device 20 can rapidly determine whether the risk potential of the region has been set, When the risk potential estimating device 20 calculates the risk potential of the bicycle B2, the calculation and setting of the risk potential of an overlapping region whose risk potential has been set (S16) are omitted, as shown in FIG. 12 (S19). As described above, the risk potential estimating device 20 can repeatedly perform Steps S11 to S19 of FIG. 2 to create the potential map M shown in FIG. 13.

Next, the calculation of the risk potential for each region of the potential map by the risk potential estimating device 20 will be described in detail. A risk function $RVn(x, y)$ indicating the risk potential around obstacles n (n=1 to N), such as vehicles, in the region in which the potential map M is set is represented by the following Expression (1):

$$RVn(x, y) = An \times exp[(-\tfrac{1}{2} \times \{((x-xn)/Sxn)^2 + ((y-yn)/Syn)^2\}] \quad (1)$$

N: the number of vehicle obstacles
An: a coefficient
xn: the x coordinate positions of the obstacles n
yn: the y coordinate positions of the obstacles n
Sxn: a variance of the obstacles n in the x direction ($\propto$ vxn (the speed of the obstacles n in the x direction))
Syn: a variance of the obstacles n in the y direction ($\propto$ vyn (the speed of the obstacles n in the y direction))

A risk function $RL(x, y)$ indicating the risk potential of a course which is calculated from information about, for example, a white line and a curb in the region in which the potential map M is set is represented by the following Expression (2):

$$RL(x, y) = B \times (y-yl)^2 \quad (2)$$

B: a coefficient
yl: the y coordinate of the center of the course

A total risk function $R(x, y)$ indicating the total risk potential in the region in which the mesh M is set is represented by the following Expression (3). The risk potential estimating device 20 calculates the risk potential for the coordinates $P(x, y)$ of each region using the following Expression (3):

$$R(x, y) = \Sigma\{RVn(x, y)\} + RL(x, y) \quad (3)$$

Next, the generation of the target route by the target route generating device 30 will be described. The target route generating device 30 determines an intersection point P which is a target point of the host vehicle 100. The target route generating device 30 searches for a route with the minimum total risk potential calculated by the above-mentioned. Expression (3) among the routes from the current position to the target point. In this case, the target route generating device 30 can use a route search technique in a general Dijkstra method or an A* (A-star) method.

Next, the support of driving by the driving support method determining device 40 will be described. The driving support method determining device 40 calculates the predicted future position (Xm, Ym) of the host vehicle 100 after T seconds from the current speed v and yaw rate r of the host vehicle 100 using the following Expression (4):

[Equation 1]

$$\theta = \int_0^T r \cdot dt$$

$$Xm = \int_0^Y v \cdot \cos\theta \cdot dt$$

$$Ym = \int_0^T v \cdot \sin\theta \cdot dt \qquad (4)$$

The driving support method determining device 40 calculates the Y coordinate Yt of the target route that is Xm [m] ahead. When a difference |Yt−Ym| between the route of the host vehicle 100 which is predicted Xm [m] ahead and the target route is equal to or greater than a predetermined value, the driving support method determining device 40 alerts the driver using the display device 51 or the speech device 52 and starts the support of driving by the support device 53.

In this embodiment, the risk potential estimating device 20 of the driving support apparatus 10 calculates the risk potential of the objects at a plurality of points which are set around the host vehicle 100. When the pedestrian M2 is present in the blind spot B caused by the pedestrian M1 in the field of view of the host vehicle 100, the risk potential estimating device 20 omits the calculation of the risk potential of, for example, the pedestrian M2. When there is the pedestrian M1 close to the host vehicle 100, first, the behavior of avoiding the pedestrian M1 is performed. Therefore, the risk potential of the pedestrian M1 may be calculated at each point. In many cases, the calculation of the risk potential of the pedestrian M2 which is located in the blind spot B caused by the pedestrian M1 and is away from the host vehicle 100 is redundant. Therefore, when the calculation of the risk potential of the pedestrian M2 which is located in the blind spot B caused by the pedestrian M1 is omitted, it is possible to reduce the load of an operation for calculating the risk potential while maintaining the accuracy of calculating the risk potential around the vehicle.

According to this embodiment, the risk potential estimating device 20 calculates the risk potential of the objects in the order of the pedestrian M1 which is close to the host vehicle 100 and the pedestrian M2 which is further away from the host vehicle 100 than the pedestrian M1. When the risk potential of the objects is calculated in ascending order of distance from the host vehicle 100, the calculation of the risk potential of for example, the pedestrian M2 which is located in the blind spot B caused by the pedestrian M1 whose risk potential has been calculated and is away from the host vehicle 100 is omitted. Therefore, it is possible to reduce the operation load while calculating the risk potential of the object which has a great effect on the host vehicle 100.

In addition, according to this embodiment, when the pedestrian M2 is located in the blind spot caused by the pedestrian M1 in the field of view of the host vehicle 100 and the host vehicle 100 travels toward the point where the pedestrian M2 is present, the risk potential estimating device 20 calculates the risk potential of the pedestrian M2. When the host vehicle 100 travels toward the point where an object, such as the pedestrian M2, is present, it is necessary to calculate the risk potential even though the pedestrian M2 is located in the blind spot B caused by the pedestrian M1. Therefore, it is possible to calculate the risk potential of, for example, the pedestrian M2 in the blind spot, if necessary.

According to this embodiment, when the risk potential of the bicycle B2 is calculated after the risk potential of the bicycle B1 is calculated, the risk potential estimating device 20 omits the calculation of the risk potential of the bicycle B2 at the point where the risk potential of the bicycle B1 has been calculated. At the point where the risk potential of the bicycle B1 has been calculated, a behavior, such as avoidance, is performed on the basis of the risk potential of the bicycle B1. In many cases, the calculation of the risk potential of the bicycle B2 at the point where the risk potential of the bicycle B1 has been calculated is redundant. Therefore, when the calculation of the risk potential of the bicycle B2 at the point where the risk potential of the bicycle B1 has been calculated is omitted, it is possible to reduce the load of the operation for calculating the risk potential.

The embodiment of the invention has been described above, but the invention is not limited to the above-described embodiment. Various modifications and changes of the invention can be made.

INDUSTRIAL APPLICABILITY

According to the risk potential calculation apparatus of the invention, it is possible to reduce the operation load of the apparatus while maintaining the accuracy of calculating the risk potential around the vehicle,

REFERENCE SIGNS LIST

10: DRIVING SUPPORT APPARATUS
11: OBSTACLE DETECTING DEVICE
12: WHITE LINE DETECTING DEVICE
13: ROAD SHAPE DETECTING DEVICE
14: DRIVER STATE DETECTING DEVICE
15: HOST VEHICLE TRAVELING CONDITION DETECTING DEVICE
16: HOST VEHICLE POSITION DETECTING DEVICE
17: AMBIENT ENVIRONMENT DATABASE
18: DRIVER OPERATION STATE DEFECTING DEVICE
19: CONTROL MODE SWITCH
20: RISK POTENTIAL ESTIMATING DEVICE
30: TARGET ROUTE GENERATING DEVICE
40: DRIVING SUPPORT METHOD DETERMINING DEVICE
51: DISPLAY DEVICE
52: SPEECH DEVICE
53: SUPPORT DEVICE
100: HOST VEHICLE

The invention claimed is:

1. A risk potential calculation apparatus comprising:
a risk potential calculation unit including executable program logic configured to calculate a risk potential at each intersection point of lattice-shaped regions set for a host vehicle or in each region within the lattice-shaped regions, the risk potential being based on an object detected in the lattice-shaped regions by an obstacle detecting device mounted on the host vehicle,
wherein the lattice shaped regions are set in a field of view of the host vehicle, and
wherein, when there is a second object present in a blind spot behind a first object in the lattice shaped regions, the second object being detected by the obstacle detecting device, the risk potential calculation unit omits the calculation of the risk potential based on the second object.

2. The risk potential calculation apparatus according to claim 1, wherein the risk potential calculation unit searches for objects in ascending order of distance from the host vehicle using the obstacle detecting device.

3. The risk potential calculation apparatus according to claim 1, wherein the risk potential calculation unit omits the calculation of the risk potential at the intersection point or in the region where the one object is present but the risk potential of another object is already applied.

4. The risk potential calculation apparatus according to claim 2, wherein the risk potential calculation unit omits the calculation of the risk potential at the intersection point or in the region where the one object is present but the risk potential of another object is already applied.

5. A risk potential calculation apparatus comprising:
a risk potential calculation unit including executable program logic configured to calculate a risk potential at each intersection point of lattice-shaped regions set for a host vehicle or in each region within the lattice-shaped regions, the risk potential being based on an object detected in the lattice-shaped regions by an obstacle detecting device mounted on the host vehicle,
wherein the lattice shaped regions are set in a field of view of the host vehicle, and
wherein, when there is a second object present in a blind spot behind a first object in the lattice shaped regions, the second object being detected by the obstacle detecting device:
(a) the risk potential calculation unit omits the calculation of the risk potential based on the second object if the second object does not exist in a region where the host vehicle will pass through, or
(b) the risk potential calculation unit calculates the risk potential based on the second object if the second object exists in the region where the host vehicle will pass through.

6. The risk potential calculation apparatus according to claim 5,
wherein the risk potential calculation unit searches for objects in ascending order of distance from the host vehicle using the obstacle detecting device.

7. The risk potential calculation apparatus according to claim 5,
wherein the risk potential calculation unit omits the calculation of the risk potential at the intersection point or in the region where the one object is present but the risk potential of another object is already applied.

8. The risk potential calculation apparatus according to claim 6,
wherein the risk potential calculation unit omits the calculation of the risk potential at the intersection point or in the region where the one object is present but the risk potential of another object is already applied.

* * * * *